(12) United States Patent
Osella et al.

(10) Patent No.: US 9,493,681 B2
(45) Date of Patent: Nov. 15, 2016

(54) ATTACHMENT DEVICE FOR SECURING ITEMS

(71) Applicants: Michael James Osella, Canonsburg, PA (US); Helen Louise Osella, Canonsburg, PA (US)

(72) Inventors: Michael James Osella, Canonsburg, PA (US); Helen Louise Osella, Canonsburg, PA (US)

( * ) Notice: Subject to any disclaimer, the term of this patent is extended or adjusted under 35 U.S.C. 154(b) by 463 days.

(21) Appl. No.: 14/108,824

(22) Filed: Dec. 17, 2013

(65) Prior Publication Data

US 2014/0182760 A1    Jul. 3, 2014

Related U.S. Application Data

(60) Provisional application No. 61/746,518, filed on Dec. 27, 2012.

(51) Int. Cl.
*B65D 5/50* (2006.01)
*C09J 7/04* (2006.01)

(52) U.S. Cl.
CPC ............... *C09J 7/04* (2013.01); *B65D 5/5035* (2013.01); *C09J 2400/283* (2013.01); *Y10T 156/10* (2015.01); *Y10T 428/28* (2015.01); *Y10T 428/2848* (2015.01)

(58) Field of Classification Search
CPC .............................. B65D 5/50; B65D 5/5035
USPC ....................................................... 206/460
See application file for complete search history.

(56) References Cited

U.S. PATENT DOCUMENTS

| | | | |
|---|---|---|---|
| 1,728,894 A | 7/1929 | Oppenheim | |
| 1,795,672 A * | 3/1931 | Plummer | A01G 9/088 206/423 |
| 2,208,268 A * | 7/1940 | Snyder | B65D 5/322 229/122.32 |
| 2,744,624 A * | 5/1956 | Hoogstoel | B65D 65/44 206/813 |
| 3,089,590 A | 5/1963 | Mell | |
| 3,424,306 A | 1/1969 | Munck | |
| 3,669,337 A | 6/1972 | Struble | |
| 3,905,474 A | 9/1975 | Haibara | |
| 4,030,603 A | 6/1977 | Angell | |
| 4,307,804 A | 12/1981 | Benham | |
| 4,606,460 A | 8/1986 | Luray | |
| 5,240,109 A * | 8/1993 | Weder | B65D 5/50 206/423 |
| 5,388,701 A | 2/1995 | Ridgeway | |
| 5,522,205 A * | 6/1996 | Weder | B65D 5/50 53/157 |

(Continued)

FOREIGN PATENT DOCUMENTS

| | | |
|---|---|---|
| EP | 2127861 A * | 12/2009 |
| JP | 2010-18305 A * | 1/2010 |

OTHER PUBLICATIONS

Machine translation of Japanese Patent 2010-18305, date unknown.*

*Primary Examiner* — Jeff Aftergut

(57) ABSTRACT

An attachment device for securing an item inside a container for shipping or storage. The attachment device can be used for a wide variety of items of varying size and shape, and allows them to be shipped in any existing box which is larger than the item. The attachment device consists of a sheet of material with bonding. The item being shipped is secured to the sheet of material, which is then bonded inside a box or container.

14 Claims, 3 Drawing Sheets

(56) References Cited

U.S. PATENT DOCUMENTS

| | | | |
|---|---|---|---|
| 5,678,695 A | 10/1997 | Greene | |
| 5,833,131 A | 11/1998 | Levi | |
| 6,039,179 A * | 3/2000 | Weder | B65D 5/50 |
| | | | 206/460 |
| 6,672,035 B1 * | 1/2004 | Simonsen | B65D 5/5028 |
| | | | 206/460 |
| 6,932,267 B2 * | 8/2005 | Potenza, Jr. | B65D 81/268 |
| | | | 206/204 |
| 7,299,926 B2 | 11/2007 | Russell | |
| 8,186,513 B2 | 5/2012 | St. John | |
| 2007/0142192 A1 * | 6/2007 | Campbell | B65D 5/0227 |
| | | | 493/131 |

* cited by examiner

US 9,493,681 B2

ATTACHMENT DEVICE FOR SECURING ITEMS

CROSS-REFERENCE TO RELATED APPLICATIONS

This application claims the benefit of provisional patent application Ser. No. 61/746,518, filed 2012 Dec. 27 by the present inventors.

BACKGROUND

Prior Art

It is well known that shipping and storage boxes of different size are used to hold items of various sizes for transportation and storage. With the huge demand for internet commerce in recent years, a wide variety of items are being shipped directly to customers. Since items range in size and require many different size boxes, there are several ways of dealing with the problem.

One approach is to keep many boxes of various sizes on hand. This takes up a lot of storage space and can be costly due to the large inventory of boxes that need to be held at all times.

Adjustable size boxes are available but these are generally much more costly than regular boxes, partly due to additional perforations and partly because a large size box is manufactured and then cut down to smaller size.

Knock-down type mailing parcels wrap around the item to be shipped and adhere to themselves, overcoming the problem of void fill. These generally suffice for rectangular shaped items such as books or DVDs but are not able to conform to other shaped objects.

Another approach is to keep a smaller range of box sizes on hand, use the box that is closest in size to the item, and filling the additional void space in the box with packing material such as peanuts, bubble-wrap, crumpled paper or air-pads. Adding peanuts or bubble-wrap to a box for the sole purpose of filling void space increases material costs and takes up significant storage space. Crumpled paper such as newspaper can be found for free or low cost but can add considerable weight to a package thus increasing postage costs. Additionally newspaper does not look professional and can be a negative aspect for retailers. Plain paper can similarly be used but has the added disadvantage of being more costly than newspaper and still increases package weight. Air-pads can be used to fill void space without significantly increasing package weight, but these require machinery to inflate which is not cost effective for smaller volume shippers. Finally if the item is left in an oversized box with no fill or securing mechanism, it will shake around in transit causing potential damage to both the shipping box and the item inside.

Another approach has been to secure items within a box so they don't shake around and become damaged. This way larger boxes can be used without the need to fill void space. Methods such as hammocks, suspension between film held by frames, and two-piece carton designs have been used.

Several approaches to securing items with a box have been proposed, for example U.S. Pat. No. 5,678,695 A describes a packing structure with a rigid backing and film to hold an object in place for shipping. It is limited since the only method of securing the rigid backing is by placing it inside a box with interior dimensions corresponding to the peripheral dimensions of the rigid backing so that it fits snugly inside the box and does not move around. This limits the dimensions of the box that can be used to those produced by the patent holder. It is also more costly since the packing requires purchasing the associated box along with the structure assembly for it to work.

U.S. Pat. No. 8,186,513 B2 describes a box construction comprising of an outer member and an inner member where the object being shipped is attached to the surface of the inner member and then held in place within the outer member by tabs that fit into slots. This again limits the dimensions of the package to those produced by the patent holder and is more costly since it involves purchasing both inner and outer members to work.

Neither of these cited approaches can be used independently from their manufactured box assembly or enclosure. They do not work with other boxes.

SUMMARY

In accordance with one embodiment, an attachment device for securing items comprises a sheet of cardboard, adhesive for bonding the cardboard to the inside of a container, and uses stretch-wrap to secure the item on to the sheet of cardboard.

Advantages

Accordingly several advantages of one or more aspects are as follows: to provide an attachment device usable in existing boxes of various sizes including previously used boxes, that secures items inside boxes so that void space does not have to be filled with dunnage, and that secures items for shipping without significantly increasing the weight of the package, all of which keep shipping costs low. Other advantages of one or more aspects will be apparent from a consideration of the drawings and ensuing description.

DRAWINGS

Figures

In the drawings, closely related figures have the same number but different alphabetic suffixes.

DRAWINGS

Figure 1A:
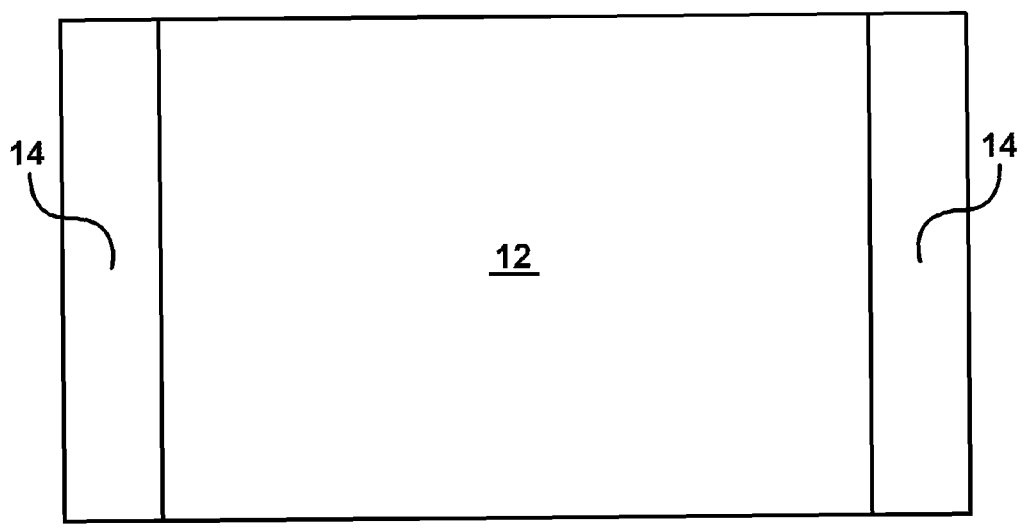
FIGS. 1A to 1B shows the attachment device from above and below with strips of bonding on opposing sides of the base sheet in accordance with one embodiment.

Reference Numerals 12 base sheet
14 bonding
16 securing medium

DETAILED DESCRIPTION

Figure 1B:
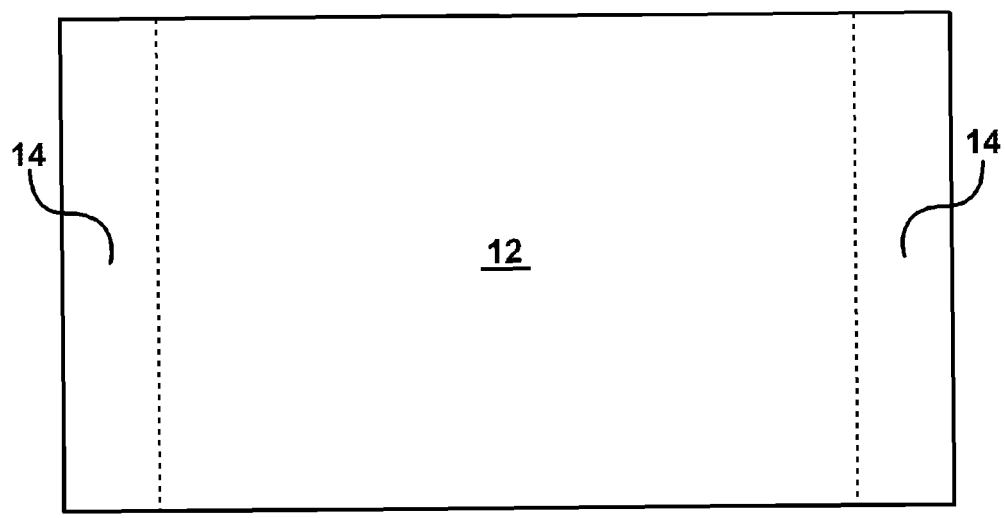
Figure 2:
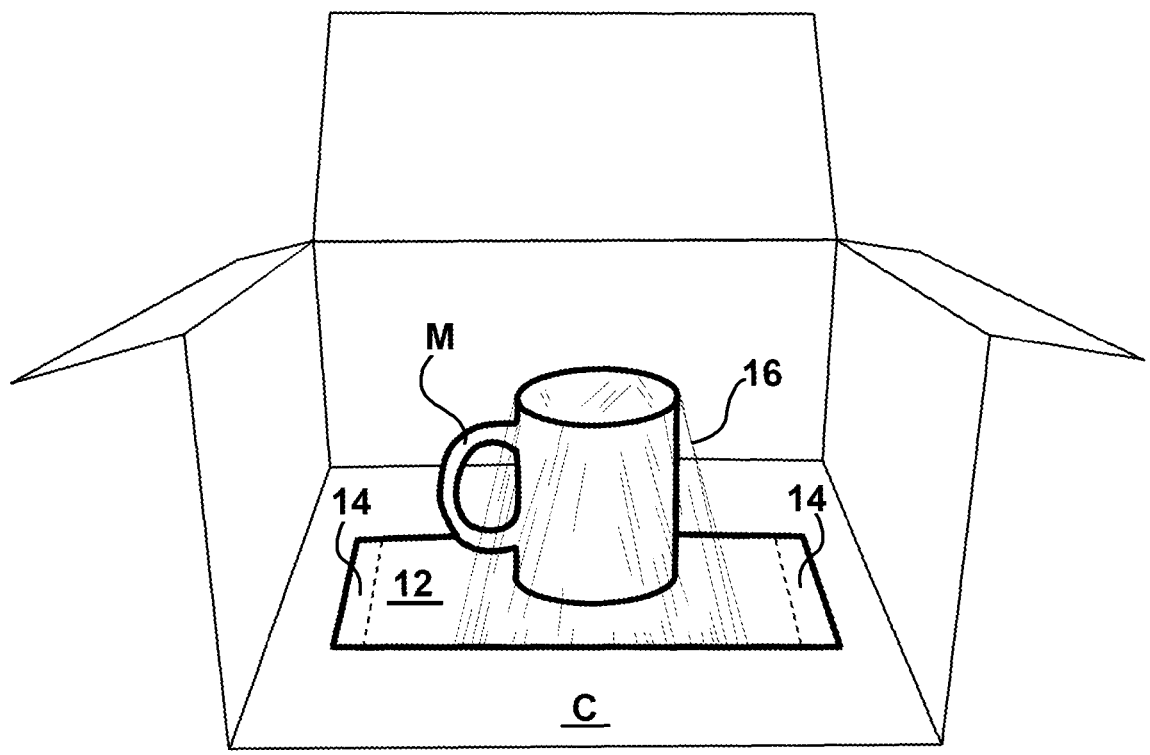
FIG. 2 shows the attachment device as it would be used in accordance with one embodiment. An item is secured to the base sheet via the securing medium and the strips of bonding attach the base sheet to the container.

First Embodiment—FIGS. 1A, 1B, 2

One embodiment of the attachment device is illustrated in FIG. 1A (bottom view) and FIG. 1B (top view). FIG. 2 shows an item secured to one embodiment of the attachment device which is bonded inside a box. The attachment device is comprised of a base sheet 12 which is flat. A strip of bonding 14 is adhered on two opposing ends of the base sheet 12.

In one embodiment the base sheet 12 is a rectangle of cardboard. However, the base sheet 12 can consist of many other materials that can hold their form such as paper board, polystyrene, metal, wood, rubber, vinyl, various plasticized materials, etc. The base sheet 12 can also have a variety of shapes, sizes and formations such square, triangle, cross shaped etc. and may have straight or curved edges. The base sheet 12 can also be reinforced or otherwise adapted by adding folds, extra layers of base or protective materials such as cardboard, bubble-wrap, foam, styrofoam etc.

In one embodiment the bonding 14 is double-sided adhesive placed and adhered at opposing ends of the base sheet 12 with paper backing remaining on the exterior surface of the tape so the adhesive on that surface is not yet exposed. However, the bonding 14 can consist of any adhesive or fastener such as glue, epoxy, tape, staples, rivets, paper fasteners etc., in any configuration or placement on the base sheet 12, such as corners, diagonal arrangements, around the edges, etc.

FIG. 2 shows one embodiment of the attachment device with an item M secured to the base sheet 12 with a securing medium 16. The base sheet 12 is attached to a container C via the bonding 14. In one embodiment the securing medium 16 is stretch-wrap. However, other securing mediums such as netting, string, thread, fabric, shrink-wrap, wire, etc. can be used. In one embodiment the container C is a cardboard box. However, the attachment device can be bonded to other containers such as plastic boxes, tubs, cartons, crates, etc.

OPERATION

First Embodiment—FIGS. 1A, 1B, 2

The manner of using the attachment device to attach an item to the inside of a container is by first placing the item M on the top surface of the base sheet 12. Next, hold the base sheet 12 and the item M together while wrapping the securing medium 16 around both the item M and the center portion of base sheet 12 several times until the item M is held in place. The paper backing is removed from the double-sided adhesive 14 at both ends of the base sheet 12 so the adhesive is exposed. The attachment device is then positioned where desired in the container C, and is pushed down firmly so that the adhesive 14 is bonded to the bottom interior surface of the container C. This results in holding the item M stationary inside the container C via the attachment device.

CONCLUSIONS, RAMIFICATIONS, AND SCOPE

Accordingly the reader will see that the attachment device provides a means of quickly securing an item inside any available box without the need for additional fill, and without significantly increasing the weight of the package which results in saving time and money. It can be used for items of various shapes and sizes, takes up minimal storage space, allows existing boxes to be used, gives packages a professional appearance, and reduces waste which is better for the environment.

While the above description contains many specificities, these should not be construed as limitations on the scope of any embodiment but as exemplifications of various embodiments thereof. Many other ramifications and variations are possible within the teachings of the various embodiments. For example, the attachment device can be formed in different shapes and made from different materials. Also the attachment device can be positioned in any area inside the container, and more than one attachment device could be used in a single plain or three dimensional arrangement. The bonding can be of different mediums and arranged in other positions. The base sheet can be plain, colored, or printed with logos.

Thus the scope of the embodiments should be determined by the appended claims and their legal equivalents rather than by the examples given.

We claim:

1. A container having an interior where an item is attached thereto within the container comprising:
   a sheet of material suitably sized to fit within the container comprising an upper surface and a lower surface, said upper surface comprising an area sufficient to support said item;
   a means of bonding the sheet of material to the inside of the container disposed on the lower surface of the sheet of material, and;
   a means of attaching the item to the upper surface of the sheet of material selected from the group consisting of stretch wrap, shrink wrap, netting, string, thread or wire;
   wherein the item is secured to the sheet of material with the means of attaching the item to the upper surface of the sheet of material and the lower surface of the sheet of material is secured to the interior of the container with the means of bonding.

2. The container of claim 1, wherein the sheet of material has adhesive on the lower surface for bonding the sheet material to the container.

3. The container of claim 1, wherein the sheet of material is flat with no folds.

4. The container of claim 1, wherein the sheet of material is composed of cardboard.

5. The container of claim 1, wherein the means of bonding the sheet of material to the container is double sided adhesive tape.

6. The container of claim 1, wherein the means of bonding the sheet of material to the container is disposed on opposite ends of the lower surface of the sheet of material.

7. The container of claim 1, wherein the sheet of material is rectangular in shape.

8. A method of attaching an item to the inside of a container comprising:
   providing a sheet of material which is suitably sized to fit inside the container and a means of bonding the sheet of material to the inside of the container;
   placing the item on the sheet of material and securing the item to the sheet of material with a means of securing selected from the group consisting of stretch wrap, shrink wrap, netting, string, thread or wire, and;
   securing the sheet of material to the container with the means of bonding the sheet of material to the inside of the container whereby the item is held stationary within the container for transport and storage.

9. The method of claim 8, wherein the sheet of material has adhesive on the lower surface for bonding the sheet material to the container.

10. The method of claim 8, wherein the sheet of material is flat with no folds.

11. The method of claim 8, wherein the sheet of material is composed of cardboard.

12. The method of claim 8, wherein the means of bonding the sheet of material to the container is double sided adhesive tape.

13. The method of claim 8, wherein the means of bonding the sheet of material to the container is disposed on opposite ends of the lower surface of the sheet of material.

14. The method of claim 8, wherein the sheet of material is rectangular in shape.

\* \* \* \* \*